United States Patent [19]
Gelardi et al.

[11] Patent Number: 5,199,661
[45] Date of Patent: Apr. 6, 1993

[54] WIRE REEL SPRING/CASSETTE COVER COMBINATIONS AND METHODS FOR ASSEMBLY

[75] Inventors: Anthony L. Gelardi, Cape Porpoise; Craig Lovecky, Old Orchard Beach, both of Me.; Alan Lowry, Canton, Mass.; Richard Rolfe, Biddeford, Me.; W. Tyler Fitzsimmons, Washington, D.C.

[73] Assignee: Shape Inc., Biddeford, Me.

[21] Appl. No.: 676,380

[22] Filed: Mar. 28, 1991

[51] Int. Cl.⁵ .................. G03B 1/04; G11B 15/32
[52] U.S. Cl. ........................... 242/199; 242/198
[58] Field of Search .............. 242/199, 197, 198, 189; 360/132; 267/158, 164, 165, 182

[56] References Cited

U.S. PATENT DOCUMENTS

| | | | |
|---|---|---|---|
| 3,801,042 | 4/1974 | Dobson | 242/198 |
| 4,022,402 | 5/1977 | Morimoto | 242/199 |
| 4,054,930 | 10/1977 | Terada | 242/189 X |
| 4,347,537 | 8/1982 | Schoettle et al. | 242/197 X |
| 4,452,404 | 6/1984 | Gelardi et al. | 242/71.8 |
| 4,662,579 | 5/1987 | Gelardi et al. | 242/199 |
| 4,770,367 | 9/1988 | Carroll | 242/199 |
| 4,789,195 | 12/1988 | Wennch | 267/160 |
| 4,903,916 | 2/1990 | Carroll | 360/132 X |
| 5,046,683 | 9/1991 | Carroll | 360/132 X |

FOREIGN PATENT DOCUMENTS

| | | |
|---|---|---|
| A2502169 | 7/1976 | Fed. Rep. of Germany . |
| 834503 | 5/1960 | United Kingdom . |
| A2214163 | 8/1989 | United Kingdom . |

OTHER PUBLICATIONS

UK Patent Office Search Report, Dated Apr. 21, 1992.

Primary Examiner—Daniel P. Stodola
Assistant Examiner—John F. Rollins
Attorney, Agent, or Firm—Staas & Halsey

[57] ABSTRACT

A reel spring including a wire having a flat central portion and two angled arms, each terminating in substantially planar pads, curved portions or pivot buttons. The flat central portion includes two spaced, open loops which receive corresponding projections formed on the cassette cover. The pads, curved portions or pivot buttons abut and bias the tape reel hubs downwardly when the cassette cover and base are mated. The methods of assembly include the steps of moving the loops against the projections until the corresponding projections are received by the loops and caulking or swaging the projections. The wire reel spring can be removed by merely moving the wire reel spring in the opposite direction.

10 Claims, 3 Drawing Sheets

WIRE REEL SPRING/CASSETTE COVER COMBINATIONS AND METHODS FOR ASSEMBLY

BACKGROUND OF THE INVENTION

This invention relates to a reel spring attached to the underside of a video tape cassette cover for supporting the hubs of tape reels rotatably mounted on the tape cassette base, and related methods of assembly.

A conventional video tape cassette includes a base and a cover, each made of plastic. The assembled base and cover, accommodate a pair of tape reels, each including a hub for winding magnetic recording tape therearound.

The cassette also usually includes a reel leaf spring, i.e., a spring stamped from a flat sheet of stainless steel, and the arms are bent to extend from both sides of a central, flat portion of the spring, as described in U.S. Pat. Nos. 4,368,860 and 4,662,579. Holes formed in the reel leaf spring receive projections formed to extend from a central planar area of the underside of the cover. The free ends of the projections are then ultrasonically welded to extend around the holes and permanently hold the leaf spring relative to the cover.

With the arrangement described above, when the cover including the reel leaf spring is assembled with the tape cassette base, both of the flat free ends of the arms of the spring contact rounded, projecting, pivot buttons located centrally on the hubs of the respective tape reels and bias the tape reels downwardly, so that the tape reels are rotatably retained in position. See, e.g., Assignee's U.S. Pat. No. 4,452,404. In this conventional arrangement, the plastic pivot button forms a tangent point against the flat, free end of the metal spring, which causes friction (wear) and heat build-up at this interface. To avoid debris caused by friction, the pivot button must be made of a relatively expensive wear-resistant material.

A significant drawback to this type of spring is the cost. That is, flat sheet stainless steel material is rather expensive.

Further, requiring ultrasonic welding adds to the cost of overall production, and such welding slows manufacturing speed.

Also, after positioning the spring on the cover, but before welding, it is possible that the spring could be dislocated relative to the projections while progressing in the assembly line.

Moreover, with cassettes, as with all plastic consumer goods, a need exists to find ways to re-cycle the products instead of merely depositing them in land fills. Someday perhaps, it may be necessary to return pre-recorded video cassettes to be reloaded with new tape, but re-using the rest of the cassette, much as glass or plastic beverage bottles are currently returned and re-filled. Re-use would, of course, also decrease energy use.

Finally, if a defect is found in either the leaf spring or cover of the conventional cassette, the leaf spring cannot be removed without damaging both the spring and cover. These parts could not be re-used, but would have to be scrapped, which also increases overall production cost and energy costs.

As a result, the prior art discussed above still does not include the most cost-efficient reel spring and cassette cover combination, one which lends itself to easy disassembly and reuse, or related methods of assembly having the fewest steps.

SUMMARY OF THE INVENTION

Accordingly, it is an object of the present invention to provide reel spring/cassette cover combinations contributing to reducing material costs of the tape cassette.

It is another object of the present invention to provide reel spring/cassette cover combinations which are more ecological than conventional combinations and which promote energy conservation, because the parts thereof can be re-used.

It is another object of the present invention to eliminate the need for a pivot button in the hubs and ultrasonic welding of the cover projections, and to produce the springs of less expensive materials, thereby further reducing the costs of the cassette.

It is another object of the present invention to provide methods for assembling reel springs in a tape cassette which include fewer steps and lead to lower cassette production costs and faster manufacturing speeds.

It is still another object of the present invention to provide methods for assembling reel springs in a cassette which are capable of facilitated manual or automated assembly.

To achieve the foregoing and other objects of the present invention and in accordance with the purposes of the invention, there are provided wire reel spring/cassette cover combinations and economical methods for assembling the springs on the cassette.

The reel spring includes a wire, substantially linear but angled body, having opposite free ends terminating in substantially planar pads, curved portions or pivot buttons. The center of the wire body includes two spaced open loops or bends which receive corresponding projections formed on the cassette cover. The pads, curved portions or pivot buttons abut and bias the tape reel hubs downwardly, after the cover and base are mated.

The methods of assembly according to the present invention generally include the step of moving the loops against the projections in a first direction, whereupon the loops open and receive the corresponding projections. The wire reel spring can be removed by moving the spring in a second, opposite direction.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENTS

Figure 1:
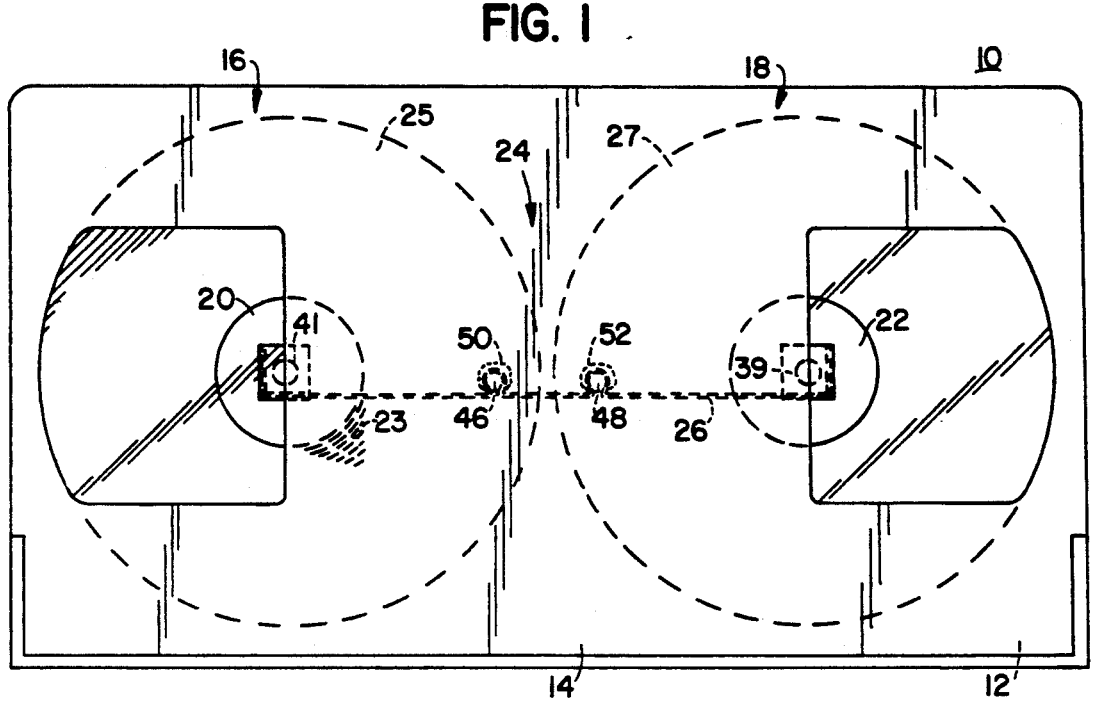
FIG. 1 is a top view of the wire reel spring/cassette cover combination according to a first embodiment of the present invention.

FIG. 1 illustrates a video tape cassette according to the present invention, the cassette being indicated generally by reference numeral 10. The cassette 10 comprises a base 12 and a cover 14, each made of a plastic resin. The assembled base 12 and cover 14 accommodate a pair of tape reels 16 and 18 in a known manner. Each of the tape reels 16 and 18 includes a hub 20 and 22, respectively, for winding magnetic recording tape 23 therearound. The tape reels 16 and 18 each include a pair of flanges 25, 27, respectively, fixed coaxially on the top and bottom of the hubs 20 and 22 for protection of the upper and lower edges of the tape 23. At a central portion of the cassette cover 10 is a planar area 24 for receiving the reel spring 26.

Figure 3:
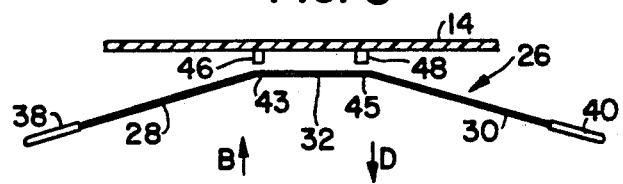
FIG. 3 is a side, cross-sectional view illustrating another method for assembling the reel spring on the cassette cover.

The reel spring 26 is an elongated wire member 29 including two arms 28 and 30 (FIG. 3) bent to extend from a flat base 32 (FIG. 3).

A benefit of this invention is that relatively common and inexpensive wire stock can be used for the wire member 29, for example, 300 series stainless steel. An appropriate length merely needs to be cut, and the arms 28, 30 bent. There is no need to stamp a relatively large spring from a more expensive flat sheet of stainless steel. Clearly, far less material per unit is required when compared with stamped leaf springs. Alternatively, the entire spring 26 could be made of aluminum or plastic.

The flat base 32 of the wire spring 26 includes two spaced loops or bends 42, 44 which have openings 43, 45 to receive corresponding projections 46, 48 formed on the cassette cover 14. After the wire spring 26 is mounted on the projections 46, 48, the projections 46, 48 can be caulked or swaged to cause overlaps or ledges 50, 52 and ensure the spring 26 does not move toward the free ends of the projections 46, 48.

Figure 2:
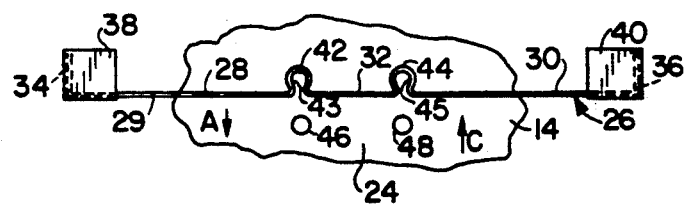
FIG. 2 is a bottom view illustrating a method for assembling the reel spring onto the cassette cover according to the present invention.

In a first embodiment shown in FIGS. 1-3, the reel spring 26 also includes, over free ends 34, 36, substantially planar pads 38, 40, respectively. The pads 38, 40 can have edges bent over the free ends 34, 36 of the wire member 29, or be welded thereto. The pads 38, 40 abut the conventional pivot buttons 39, 41, just as the flat free ends of a coined reel leaf spring would.

Different materials could be used for the wire member 29 and pads 38, 40, just as with the spring 26. In this way, relatively inexpensive wire can be used to form the wire body 29, whereas the pads 38, 40 can be formed from the more expensive sheet stainless steel, an alloy or a resilient plastic using strip molding.

Figure 4:
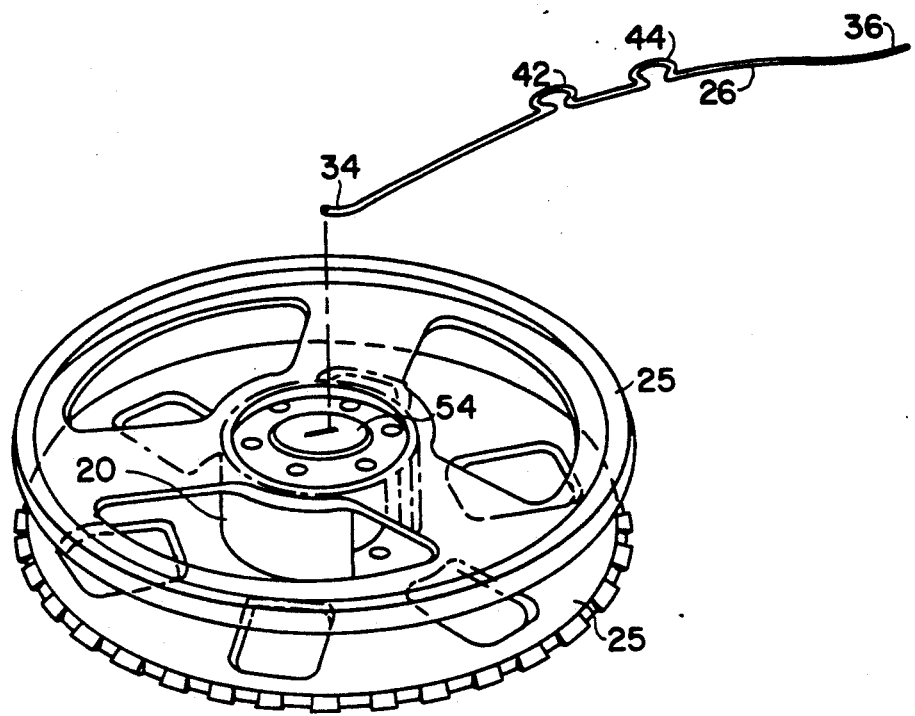
FIG. 4 is an exploded perspective view of the reel spring and a tape reel according to a second embodiment.
Figure 5:
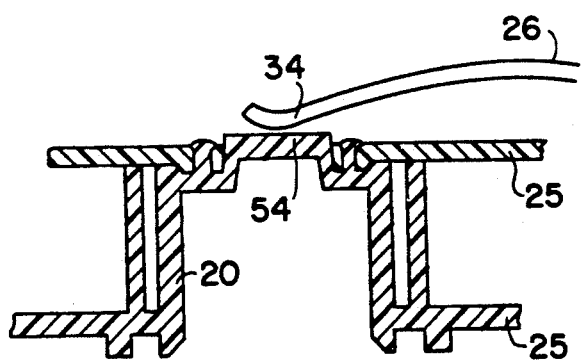
FIG. 5 is a side, cross sectional view of the curved free end of the reel spring biasly abutting a central, flat area formed on the tape reel hub, according to the second embodiment.

In a second embodiment shown in FIGS. 4 and 5, the spring 26 includes slightly upwardly curved or bent free ends 34, 36. The curved free ends 34, 36 abut flat, polished areas 54 formed centrally on the hub 20, 22. The metal spring 26 forms a single point tangent with the flat plastic area 54, thereby preventing heat build up and friction. As a result, the flat area is not prone to wear and the conventional pivot button is no longer needed. Eliminating the pivot button, which is usually separately molded of relatively expensive acetal and then assembled into the hub, further reduces material and production costs for the cassette. More particularly, the hub, including the flat area 54, can be made entirely out of styrene without the fear of friction causing particles to be generated, contaminating the tape.

Figure 6:
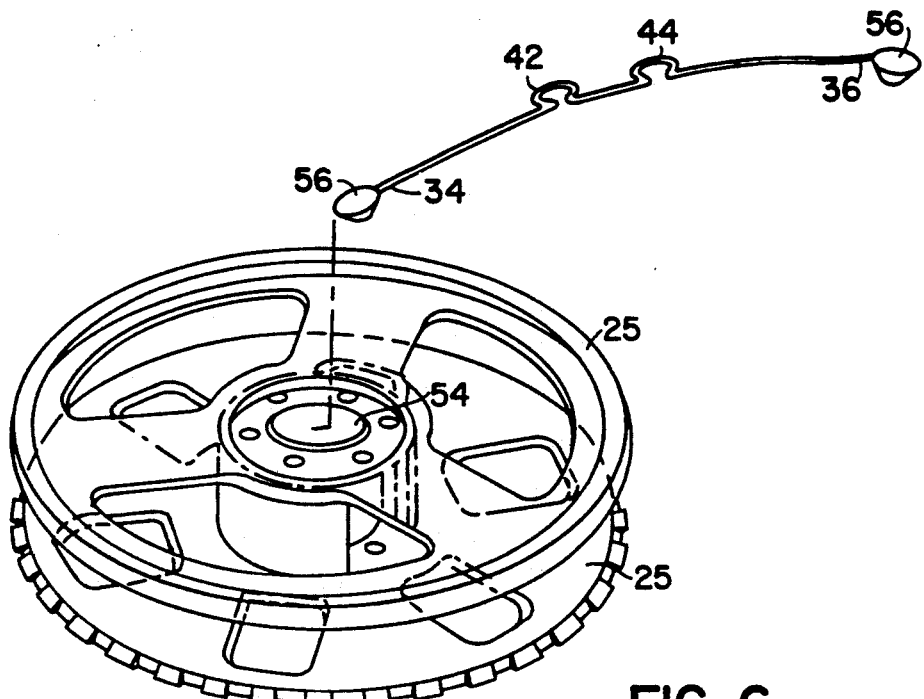
FIG. 6 is an exploded perspective view of the reel spring and a tape reel according to a third embodiment.
Figure 7:
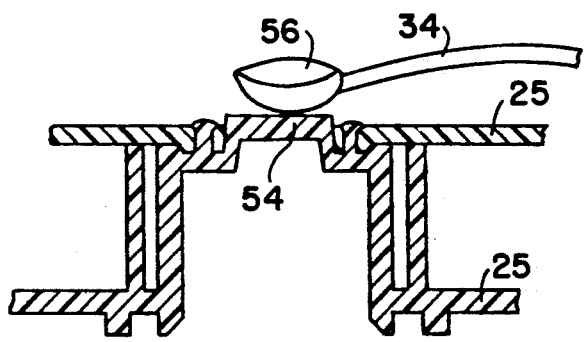
FIG. 7 is a side, cross sectional view of the free ends of the wire spring receiving a pivot button, which abuts a flat area of the hub, according to the third embodiment.

In a third embodiment shown in FIGS. 6 and 7, the free ends 34, 36 of the spring 26 receive pivot buttons 56. For example, the pivot buttons 56 could be molded directly on the free ends 34, 36 of the spring 26, or the free ends 34, 36 could be looped to receive the pivot buttons 56 therein. The pivot buttons 56 would abut the flat area 54 of the hubs 20, 22 just like the curved ends 34, 36 described above, again creating a single point tangent and preventing wear and heat build up.

The methods of assembling the above-described embodiments of the spring 26 on the tape cassette 10 are as follows.

In one embodiment shown in FIG. 2, the wire spring 26 is moved toward the area 24 of the cassette cover 14 in a direction parallel to the planar area 24 (arrow "A" of FIG. 2) such that the openings 43, 45 of the loops 42, 44 are lined up with the corresponding projections 46, 48. The wire spring 26 is further pushed toward the projections 46, 48, such that the loops 42, 44 are forced to open slightly, leading the projections 46, 48 within the loops 42, 44.

Caulking or swaging may not be necessary since the spring bias or interference fit between the inner circumference of the loops 42, 44 and the outer circumference of the projections 48 should be tight enough to prevent movement of the spring 26 relative to the projections 46, 48. This tight fit prevents the spring from dislodging while progressing in assembly, as might happen with the conventional spring and cassette cover combination. If said caulking or swaging is desired, a bar can be used during manufacturing which pushes on the free ends of the projections and deforms same, this method is faster and less expensive than ultrasonic welding.

According to an alternate embodiment shown in FIG. 3, the spring 26 is moved in a perpendicular direction "B" toward the cassette cover 14 such that the openings 43, 45 of the loops 42, 44 are lined up with the corresponding projections 46, 48. The wire spring 26 is further pushed down on the projections 46, 48, such that the loops 42, 44 are forced to open slightly, leading the projections 46, 48 within the loops 42, 44. The projections 46, 48 can then be caulked or swaged.

Once assembled, as shown in FIG. 1, the coined reel leaf spring 26 is connected to the underside of the cover 14 so that the pads 38, 40 of the first embodiment protrude downwardly, away from the cover 14. Alternatively, the curved free ends 34, 36 should be positioned so that the curved portion extends downwardly and the wire ends extend upwardly. With the third embodiment, the pointed portions of the pivot buttons 56 extend downward. When the cover 14 is assembled with the base 12, the pads 38, 40, free ends 34, 36, or pivot buttons 56 contact the corresponding pivot buttons 39, 41 or flat area 54 of the hubs 20 and 22, tension is caused in the arms 28, 30 and the arms 28, 30 bias the tape reels 16 and 18 downwardly, so that the tape reels 16 and 18 are rotatably retained in position.

In either embodiment of the method invention described above, the removal of the spring 26 from the cover 14, when desired, is also contemplated. For example, if a defect is found in the spring 26 or in the cover 14, the leaf spring 26 can be easily removed from the cover 14 and either part can be reused.

More particularly, where caulking or swaging of the projections 46, 48 is not used, the above steps for installing the spring 26 on the cassette cover 14 are merely reversed: the spring 26 is moved in reverse directions (parallel "C" or perpendicular "D", respectively) so that the projections 46, 48 are no longer received by the loops 42, 44. Then the spring 26 can be fully withdrawn from the cassette cover 14.

Even if the free ends of the projections 46, 48 are caulked or swaged, the spring 26 can be removed. That is, the spring 26 can still be moved in a direction "C" parallel to the planar area 24, without the caulked or swaged ends of the projections 46, 48 interfering.

With the present invention, there is no need to modify the molds for forming the cassette cover 14. That is, the same projections 46, 48 which are used with conventional reel leaf springs can also be used with the wire spring 26 according to the present invention. Not having to modify the mold, of course, keeps costs down. Further, the cost of producing the spring is also decreased since less metal is used, defective springs can be recycled, different, less expensive types of materials can be used to make the wire body and the dies cost less. Also, the likelihood of the spring coming undone during assembly is eliminated. Finally, if a defect is found in either the spring or the cassette cover, these members can be disassembled, the defective part recycled and the non-defective part reused. These features, of course, further lead to reducing the overall cost of the cassette.

As can be seen, a tape cassette made according to the present invention can be used by the consumer, returned, easily dismantled, reloaded with tape, and resold. Most particularly, the reel spring can be easily removed and replaced if necessary, without damaging any parts of the tape cassette.

The foregoing is considered illustrative only of the principles of the invention. Further, since numerous modifications and changes will readily occur to those skilled in the art, it is not desired to limit the invention to the exact construction and operation shown and described. For example the above-described tape cassette has been shown to be of the type intended for use in video tape players/recorders. However, the invention can be similarly applied to tape cassettes for use in audio or other playing/recording apparatus. Moreover, although the reel spring is characterized as being removably attached to the cover, the spring could be connected to the cassette base, if desired. Accordingly, all suitable modifications and equivalents may be resorted to that fall within the scope of the invention and the appended claims.

We claim:

1. A tape cassette reel spring/cover combination, comprising:
   (a) an area formed on a planar area of the cassette cover for receiving a reel spring;
   (b) a pair of tape reels positioned on a planar area of a cassette base, each tape reel including a flat surface;
   (c) an elongated metal reel spring, including a wire body with two legs, each leg including two ends and a portion between the two ends which curves in a direction from the planar area of the cassette cover toward the planar area of the base, and back toward the planar area of the cover, said curved portion tangentially contacting the flat surface of one of the tape reels, said curved end acting as a wear surface;
   (d) means formed on the area of the cassette cover for receiving the spring; and
   (e) means formed on the spring for removably mounting the spring on the means for receiving.

2. The tape cassette as recited in claim 1, wherein the wire body has a round cross section.

3. A tape cassette reel spring/cover combination, comprising:
   (a) an area formed on the cassette for receiving a reel spring;
   (b) an elongated reel spring, including a wire body and at least one free end,
   (c) means formed on the area of the cassette cover for receiving the spring; and
   (d) means formed on the spring for removably mounting the spring on the means for receiving,
   wherein the means for removably mounting includes: a pair of spaced open loops formed on the wire body, and the means for receiving is a pair of spaced projections formed on the cassette.

4. A tape cassette, comprising:
   (a) an area formed on the cassette for receiving a reel spring;
   (b) an elongated metal reel spring, including a wire body and at least one leg having a first end and a second end, with a curved portion formed between the first and second ends of the leg;
   (c) at least one means for receiving the spring formed on the area of the cassette cover;
   (d) means formed on the spring for mounting the spring on the receiving means; and
   (e) at least one tape reel positioned in the cassette and including a flat central area on an upper surface thereof,
   wherein the curved portion contacts tangentially the flat central area of the tape reel and is a wear surface.

5. A method for removably installing a reel spring on a cassette, including the steps of:
   (a) forming a planar area on the cassette including means for receiving the reel spring;
   (b) forming a wire reel spring including means for removably mounting the spring on the receiving means;
   (c) moving the spring in a first direction parallel to the plane of the planar area to align the removably mounting means and the receiving means; and
   (d) further moving the spring in the first direction to removably mount the spring via the receiving means and removably mounting means.

6. The method as recited in claim 5, further comprising the steps of:
   (e) moving the spring in a second opposite direction to remove the spring from the receiving means.

7. The method as recited in claim 5, wherein step (a) includes the substep of forming the receiving means on a cover of the cassette.

8. A method for removably mounting a reel spring on a cassette, including the steps of:
   (a) forming a planar area on the cassette including means for receiving the reel spring;
   (b) forming a wire reel spring including expandable means for removably mounting the spring on the receiving means;
   (c) moving the spring in a first direction perpendicular to the plane of the planar area, to align the removably mounting means and the receiving means; and (d) further moving the spring in the first direction to removably mount the spring by expanding the removably mounting means over the receiving means.

9. The method as recited in claim 8, further comprising the steps of:

(e) moving the spring in a second, opposite direction to remove the spring from the receiving means.

10. The method as recited in claim 8, wherein step (a) comprises the substep of forming the receiving means on a cover of the cassette.

* * * * *